Jan. 19, 1943.   P. C. TEMPLE   2,308,727
VALVE MECHANISM
Filed June 11, 1941   2 Sheets—Sheet 1

Inventor
PAUL C. TEMPLE
By Albert G. Blodget
Attorney

Jan. 19, 1943.  P. C. TEMPLE  2,308,727
VALVE MECHANISM
Filed June 11, 1941  2 Sheets-Sheet 2

Inventor
PAUL C. TEMPLE
By Albert G. Blodgett
Attorney

Patented Jan. 19, 1943

2,308,727

UNITED STATES PATENT OFFICE 2,308,727

VALVE MECHANISM

Paul C. Temple, Decatur, Ill., assignor to A. W. Cash Company, Decatur, Ill., a corporation of Delaware Application June 11, 1941, Serial No. 397,569

9 Claims. (Cl. 137—144)

This invention relates to valve mechanisms, and more particularly to valves adapted to control the operation of hydraulic motors.

Tractors are frequently provided with implements such as graders, scrapers, bulldozers, or snow plows which can be raised and lowered by means of hydraulic motors supplied with oil or other fluid under pressure from a suitable source. Such motors are controlled by manually actuated valves. In some cases two such implements may be mounted on the same tractor. For example, a tractor may have a bulldozer on its front end and a scraper on its rear end, with an independently operable control valve for each. It is of course desirable to supply both these control valves with fluid from a common pump. However, if one of the valves is in its neutral position, allowing free circulation of the fluid at low pressure, there will be no fluid available at the higher pressure necessary for operation of the motor corresponding to the other control valve. Consequently the system would become inoperative under these conditions. Furthermore, it has been the practice to employ a separate casing for each of these control valves, and since each casing must have several connections for the flow of oil, the piping required is bulky and expensive.

It is accordingly one object of the invention to combine with a pair of independently controlled valves a simple and dependable automatic means for directing all the fluid from a common source to such of said valves as may require the same.

It is a further object of the invention to provide a valve mechanism of comparatively simple and dependable construction adapted to control the operation of the hydraulic motors independently.

It is a further object of the invention to provide a dual valve mechanism having a single casing and so constructed and arranged as to simplify the various piping connections required.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts:

Figure 1:
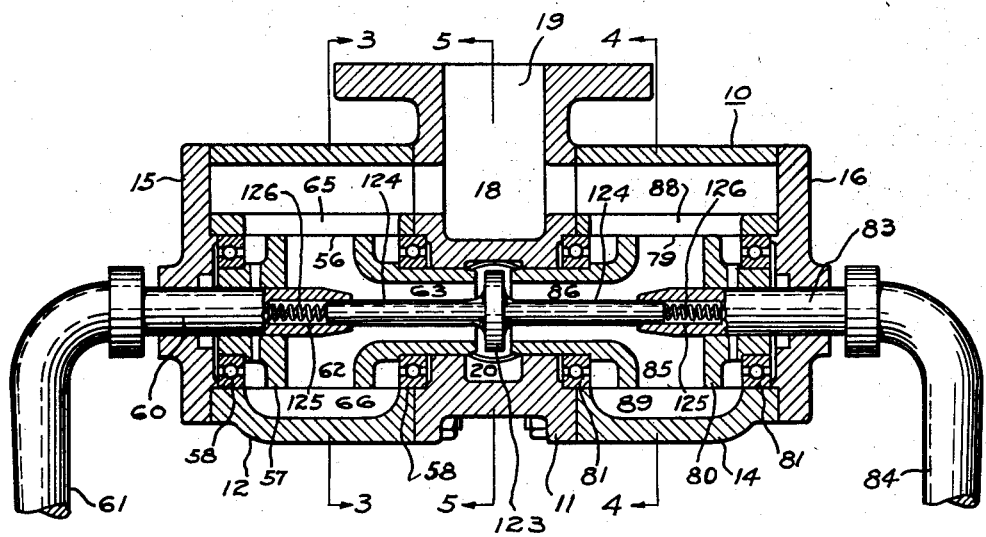
Fig. 1 is a longitudinal section through a dual valve mechanism, the section being taken on the line 1—1 of Fig. 3.
Figure 3:
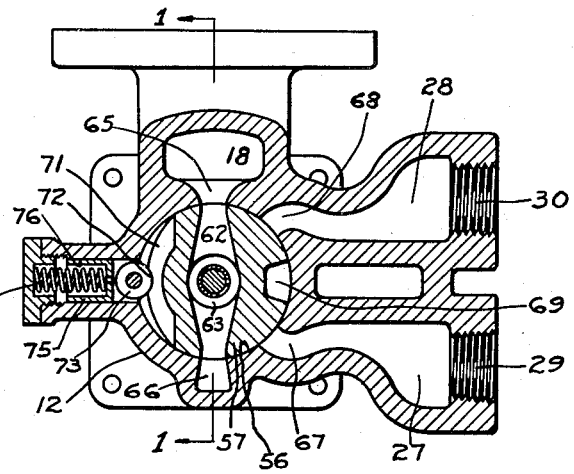
Fig. 3 is a section on the line 3—3 of Fig. 1.
Figure 4:
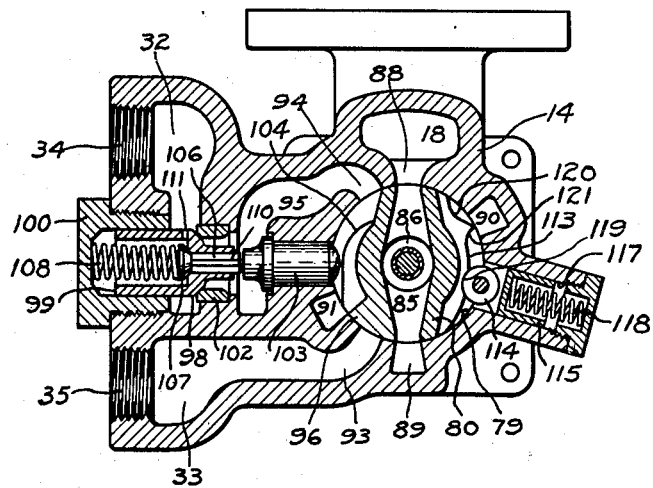
Fig. 4 is a section on the line 4—4 of Fig. 1.
Figure 5:
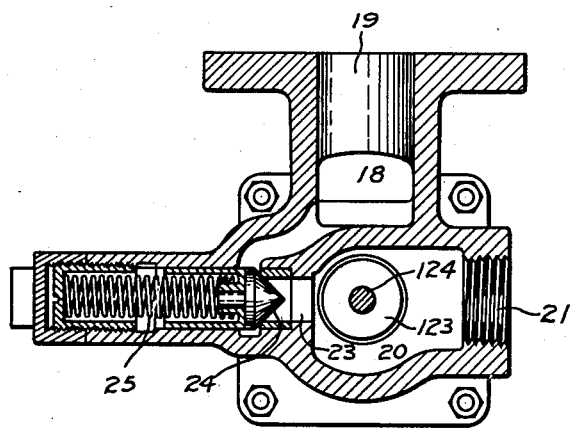
Fig. 5 is a section on the line 5—5 of Fig. 1.

The embodiment illustrated comprises a hollow casing 10 which is formed of five separate parts for convenience in manufacture and assembly. These parts include a central body 11, valve housings 12 and 14 mounted on opposite sides of the body, and heads 15 and 16 which close the outer ends of the respective housings, all as shown in Fig. 1. An elongated exhaust chamber 18 is provided in the upper portion of the casing, and an exhaust passage 19 extends uwardly from this chamber in the central body 11. Directly beneath this passage 19 there is located an inlet chamber 20 having an inlet opening 21 (Fig. 5). A port 23 leads from the inlet chamber to the exhaust chamber, and this port is normally closed by a pressure relief valve 24 which is loaded by means of a coiled compression spring 25. The construction is such that the valve 24 will open if necessary to prevent the fluid pressure in the inlet chamber from exceeding a predetermined value. As shown in Fig. 3, the housing 12 is shaped to provide two chambers 27 and 28 which, for lack of better terms, will be respectively designated as "raise" and "lower" chambers. Two openings 29 and 30 communicate with these chambers respectively. As shown in Fig. 4, the housing 14 is shaped to provide a "raise" chamber 32 and a "lower" chamber 33 with which two openings 34 and 35 communicate respectively.

Figure 2:
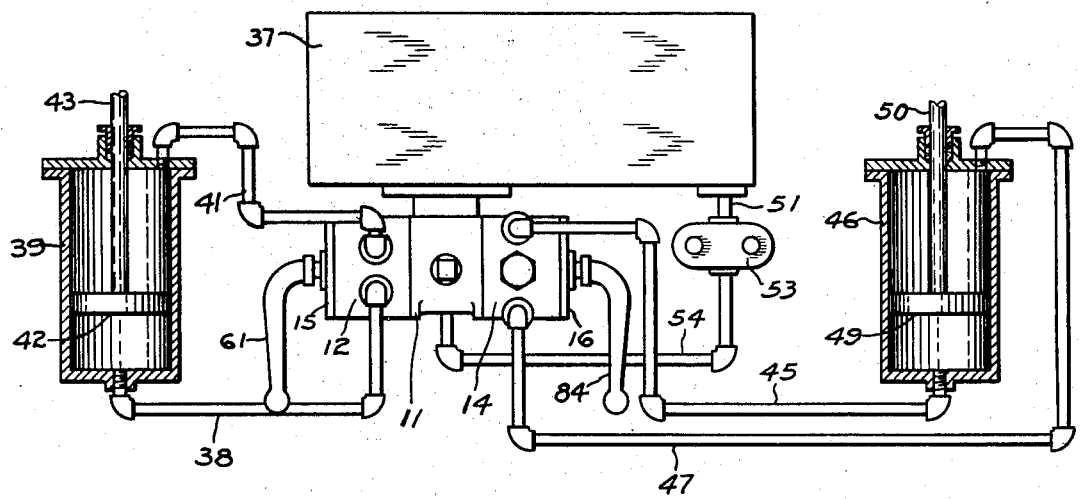
Fig. 2 is an elevation of the valve mechanism with other apparatus connected thereto.

Referring now to Fig. 2, it will be seen that the central body 11 is secured directly to the bottom of a tank or reservoir 37. This tank contains a suitable operating fluid, such as oil, and the exhaust opening 19 is in direct communication with the tank. The opening 29 is connected by a pipe 38 to the lower end of an upright cylinder 39, and the opening 30 is connected by a pipe 41 to the upper end of this same cylinder. Within the cylinder there is provided a slidable piston 42 having a piston rod 43. The opening 34 is connected by a pipe 45 to the lower end of an upright cylinder 46, and the opening 35 is connected by a pipe 47 to the upper end of this same cylinder. Within the cylinder there is provided a slidable piston 49 having a piston rod 50. Oil is withdrawn from the tank 37 through a pipe 51 by means of a pump 53 and delivered through a pipe 54 to the inlet opening 21. The pump may be driven by any suitable source of power.

The entire apparatus may be mounted upon a tractor, and the piston rod 43 may be connected to a scraper on the rear end of the tractor, while the piston rod 50 may be connected to a bulldozer on the front end of the tractor.

Referring now to Figs. 1 and 3, it will be seen that the housing 12 is provided with a cylindrical bore 56 to receive a rotary valve 57. The ends of this valve are supported in two ball bearings 58 mounted within the bore 56. A stem 60 extends axially outward from one end of the valve and through the head 15, the outer end of this stem having a handle 61 thereon, so that the valve may be turned about its axis. The central portion of the valve is provided with a diametrically extending port 62 which connects with an axial passage 63 leading directly into the inlet chamber 20. Adjacent the ends of the port 62 the valve has substantially the same diameter as the bore 56 to form a seal, but near the bearings 58 the diameter is reduced, as shown in Fig. 1, to allow circulation of fluid around the reduced portions.

Several ports are provided in the wall of the bore 56. A port 65 connects the exhaust chamber 18 with the bore, and a port 66 is located diametrically opposite the port 65. There are also two ports 67 and 68 which connect the chambers 27 and 28 respectively with the bore. These last-mentioned ports are located ninety degrees apart, and forty-five degrees from the ports 66 and 65 respectively. A longitudinal port or groove 69 is provided in the outer surface of the valve, this port being located ninety degrees from the diametrically extending port 62 and on the same side as the ports 67 and 68. On the opposite side of the valve from the port 69 there is provided a cam 71 having a notch 72 therein, this cam being engaged by an indexing roller 73 carried by a small plunger 75. This plunger is slidably mounted in a radially extending bore 76 in the housing 12. A coiled compression spring 77 urges the plunger inwardly, the parts being so constructed and arranged that when the roller 73 rests in the notch 72, the valve port 62 will be in registration with the housing exhaust ports 65 and 66 as shown in Fig. 3, the ports 67 and 68 being closed. This will hold the piston 42 stationary. The ports 62, 67 and 68 are of substantially the same length, in a direction parallel with the axis of the valve, but the ports 65, 66 and 69 are somewhat longer. Thus, when the valve is turned forty-five degrees in a clockwise direction from the position illustrated, the valve port 62 will register with the housing port 68 to admit fluid thereto, whereas the valve port 69 will register with the housing port 67 to exhaust fluid therefrom, and the piston 42 will be lowered. Similarly, when the valve is turned forty-five degrees in an anti-clockwise direction from the position shown, the valve port 62 will register with the housing port 67 to admit fluid thereto, and the valve port 69 will register with the housing port 68 to exhaust fluid therefrom. This will cause the piston 42 to move upwardly. The valve 57 thus provides a means for raising and lowering the scraper or other device connected to the piston rod 43, and for holding the same fixed in any desired position.

Referring now to Figs. 1 and 4, it will be seen that the housing 14 is provided with a cylindrical bore 79 to receive a rotary valve 80 which is axially aligned with the valve 57. While these two valves may be of identical construction, there are preferably certain differences for the reason that a bulldozer requires a somewhat different control from a scraper. The valve 80 and its associated housing ports are preferably constructed in accordance with the disclosure in my prior patent application Serial No. 388,815, filed April 16, 1941. The ends of this valve are supported in two ball bearings 81 mounted within the bore 79. A stem 83 extends axially outward from one end of the valve and through the head 16, the outer end of this stem having a handle 84 thereon, so that the valve may be turned about its axis. The central portion of the valve is provided with a diametrically extending port 85 which connects with an axial passage 86 leading directly into the inlet chamber 20. Adjacent the ends of the port 85 the valve has substantially the same diameter as the bore 79 to form a seal, but near the bearings 81 the diameter is reduced to allow circulation of fluid around the reduced portions.

Several ports are provided in the wall of the bore 79. A port 88 connects the exhaust chamber 18 with the bore, and a port 89 is located diametrically opposite the port 88. There are also two diametrically opposite ports 90 and 91 which are circumferentially spaced approximately sixty degrees from the ports 88 and 89 respectively. These four ports are elongated in the axial direction sufficiently to ensure that they will remain in communication around the valve regardless of its position. Between the ports 89 and 91 there is provided a port 93 which leads directly to the "lower" chamber 33. About thirty degrees circumferentially from the port 88, and on the opposite side thereof from the port 90, there is provided a port 94 which is connected with the "raise" chamber 32 by means of a passage 95. These ports 93 and 94 are shorter in the axial direction than the ports 88, 89, 90 and 91, and preferably of substantially the same size as the valve port 85, for reasons which will be made apparent hereinafter. As shown in Fig. 4, the valve 80 is formed with a circumferentially extended portion 96 which overlaps and closes the port 93 when the valve port 85 is aligned with the ports 88 and 89.

The passage 95 has associated therewith a check valve 98 of the poppet type arranged to open in the direction of flow toward the "raise" chamber 32. This valve is formed with a cylindrical sleeve 99 which is slidably supported in a plug 100 screw-threaded in the housing 14, and it cooperates with an annular seat member 102 mounted in the passage. The valve 98 is arranged to be opened by means of a plunger 103 aligned therewith and slidably mounted in the housing 14, one end of this plunger extending into the bore 79 in position to be engaged by a cam 104 formed on one side of the rotary valve 80. This cam is so shaped that the valve 98 will be open when the rotary valve 80 is turned to bring the port 85 into registration either with the port 93 or with the ports 90 and 91.

Since the check valve 98 is unbalanced, considerable force would be required to open it directly against a high fluid pressure in the "raise" chamber 32. In order to avoid this difficulty, this valve is formed with a passage 106 which extends axially therethrough, the flow through this passage being controlled by a pilot check valve 107 arranged to open in the same direction as the main valve 98. A coiled compression spring 108 urges the pilot valve 107 toward its closed position. The pilot valve is provided with a valve stem 110, this stem being long enough to be engaged by the plunger 103 slightly before the latter engages the main valve 98. This stem 110 is of non-circular cross-section to avoid complete closure of the passage 106. A small orifice 111 is provided in the sleeve 99 to allow fluid from the chamber 32 to reach the pilot valve 107. Once the pilot valve is opened, fluid may flow through the orifice 111 and passage 106 to reduce the unbalanced load on the main valve and facilitate the opening thereof.

In order to assist the operator in adjusting the rotary valve 80 to desired positions, this valve is provided with an index cam 113 at the side opposite the cam 104. This index cam is engaged by a roller 114 which is mounted on the inner end of a plunger 115, the latter being slidable in a bore 117 formed in the housing 14 and extending radially into the main bore 79. The plunger 115 is urged inwardly by means of a coiled compression spring 118. The cam 113 is provided with a recess 119 in which the roller rests when the valve 80 is in the neutral position shown in Fig. 4, and with a recess 120 in which the roller rests when the valve is turned to its "float" position, with the port 85 in registration with the ports 90 and 91. The recess 119 is considerably nearer the axis of the valve than the recess 120. Moreover, the cam surfaces at opposite sides of the recess 119 are inclined inwardly toward the same, so that the pressure of the roller will return the valve to neutral position from either the "raise" position in which the port 85 registers with the port 94, or the "lower" position in which the port 85 registers with the port 93, upon release of the handle 84. Once the valve is placed in its "float" position, it will be held there until it is turned by means of the handle. Thus it is in only the "raise" and "lower" positions that the operator need retain his grip on the handle. A projecting portion 121 of the cam is so located as to engage the roller when the valve is in the "lower" position, to assist the operator in placing the valve accurately in this position. It will be apparent that with the valve in the neutral position shown in Fig. 4, oil will circulate at low pressure from the inlet port 86 to the exhaust chamber 18, the port 93 being closed by the valve portion 96, and the passage 95 being closed by the check valve 98, which will prevent any leakage of fluid despite relatively high oil pressure in the raise chamber 32 caused by the weight of the bulldozer. By turning the valve 80 to its "raise" position, oil will be admitted to the port 94 and exhausted from the port 93, thus raising the bulldozer. By turning the valve to its "lower" position, oil will be admitted to the port 93 and exhausted from the port 94, the check valve 98 being held open by the cam 104, so that the bulldozer will be lowered. With the valve 80 in its "float" position, the oil will circulate freely, both the ports 93 and 94 will be open to the exhaust, and the check valve 98 will be held open, so that the bulldozer may move up and down freely and follow the contour of the ground.

It will be apparent from the above disclosure that the valves 57 and 80 can be actuated independently to control their respective hydraulic motors, but for this control to be effective it is necessary that oil be available at a sufficiently high pressure to actuate the motors when required. However, both valves receive their oil supply from the same inlet chamber 20, and each valve is constructed to allow free circulation of oil at low pressure except when the corresponding motor is being actuated. Consequently, with the construction as so far described, if either valve is in its neutral position and the other valve is turned in an attempt to actuate its corresponding motor, no pressure will be available for such actuation, since all the oil delivered by the pump will flow freely to the exhaust through the first valve.

This difficulty is avoided by a mechanism which will now be described. Referring to Fig. 1, it will be seen that the adjacent inner ends of the rotary valves 57 and 80 are spaced apart so that oil from the inlet chamber 20 may enter the central valve ports 63 and 86. These adjacent inner ends are finished smoothly to provide annular valve seats, and between them there is mounted a disk-shaped valve 123. This valve is yieldably biased toward the central or neutral position shown in the drawings, in which both the ports 63 and 86 are open, but it can move toward either of the rotary valves to close the corresponding port therein. For this purpose the valve 123 is provided with oppositely extending axially aligned stems 124, the outer ends of these stems resting slidably in recesses 125 formed in the inner ends of the rotary valve stems 60 and 83. Within each of these recesses there is mounted a comparatively light coiled compression spring 126.

The operation of the invention will now be apparent from the above disclosure. So long as both the valves 57 and 80 are in their neutral positions, the oil entering the inlet chamber 20 from the pump 53 will divide at the valve 123, half of the oil entering the valve port 63 and the other half entering the valve port 86. From these valve ports the oil will flow freely and at low pressure to the exhaust chamber 18. Since the fluid pressures on the valve 123 are balanced, this valve will be yieldably held in its central position by the springs 126. If now the operator wishes to raise the scraper, he will turn the valve 57 by means of the handle 61 to the "raise" position, with the valve port 62 in registration with the port 67. Any oil now entering the valve port 63 will be directed into the lower end of the cylinder 39, but such flow cannot occur without moving the piston 42 which is connected to the scraper, and the piston will not raise the scraper so long as the oil pressure remains at a low value. Consequently all the oil delivered by the pump will enter the valve port 86 and there will be a drop in the pressure of the oil as it flows inwardly between the valve 123 and the inner end of the rotary valve 80. This will unbalance the fluid pressures on the valve 123 so that it will move to the right in Fig. 1 and close the valve port 86, causing all the oil delivered by the pump to flow into the valve port 63 and thence to the cylinder 39. The pressure will immediately increase to the value necessary to move the piston 42. When the rotary valve 57 is returned to its neutral position, the unbalanced pressure on the valve 123 will be released and the springs 126 will return it to the central position shown in Fig. 1. Similiarly if the rotary valve 80 is turned in order to change the position of the bulldozer, flow through the valve port 86 will be momentarily blocked because of the resistance of the piston 49, and the resultant unbalanced fluid pressure on the valve 123 will cause it to move to the left in Fig. 1, closing the valve port 63. Consequently all the oil delivered by the pump will be diverted to the cylinder 46 at whatever pressure is necessary to effect movement of the piston 49. When the rotary valve 80 is returned to its neutral position, the unbalanced pressure on the valve 123 will be released and it will be returned to its central position by the action of the springs 126.

It will also be noted that if the rotary valve 80 is placed in its "float" position the oil can circulate freely therethrough at low pressure, just as in the neutral position, and the valve 123 will accordingly remain in its neutral position until one or the other of the rotary valves is moved to a position such that oil at a higher pressure is required.

It will now be apparent that the invention provides a comparatively simple, inexpensive and dependable valve mechanism including two independently operable valves. Both these valves are mounted in a single casing, and only one inlet opening and only one exhaust opening is required. Consequently the mechanism is more compact and fewer piping connections are needed. The construction is such that the oil is normally circulated at low pressure, with negligible consumption of power, and yet this pressure will immediately increase to the required amount whenever one of the valves is turned to actuate its corresponding motor.

Having thus described my invention, what I claim as new and desire to secure by Letters Patent is:

1. A valve mechanism comprising means providing an inlet chamber for fluid under pressure with two ports leading outwardly therefrom, an independently operable control valve associated with each port, each valve having a neutral position in which the fluid entering the corresponding port will be allowed to exhaust at low pressure and an operating position in which the fluid will be directed to a place of use, and means operable automatically, when either of the valves is moved to its operating position, to close the port associated with the other valve.

2. A valve mechanism comprising two independently operable control valves, common means to supply fluid under pressure to both valves, each valve having a neutral position in which the fluid will be allowed to exhaust at low pressure and an operating position in which the fluid will be directed to a place of use, and a valve device actuated by variations in the fluid pressure and arranged to prevent flow of fluid to one control valve in its neutral position when the other control valve is moved to its operating position.

3. A valve mechanism comprising a casing shaped to provide an inlet chamber for fluid under pressure, two independently operable control valves arranged to receive fluid from the said chamber, each valve having a neutral position in which the fluid will be allowed to exhaust at low pressure and an operating position in which the fluid will be directed to a place of use, and a valve device located in the inlet chamber and arranged to prevent flow of fluid to one control valve in its neutral position when the other control valve is moved to its operating position.

4. A valve mechanism comprising a casing shaped to provide an inlet chamber for fluid under pressure and an exhaust chamber, two independently operable control valves arranged to receive fluid from the inlet chamber, each valve having a neutral position in which the fluid will be directed into the exhaust chamber and an operating position in which the fluid will be directed to a place of use, and a valve device located in the inlet chamber and actuated by variations in the fluid pressure, the valve device being arranged to prevent flow of fluid to one control valve in its neutral position when the other control valve is moved to its operating position.

5. A valve mechanism comprising a casing shaped to provide an inlet chamber for fluid under pressure with two ports leading outwardly therefrom, an independently operable control valve associated with each port, each valve having a neutral position in which the fluid entering the corresponding port will be allowed to exhaust at low pressure and an operating position in which the fluid will be directed to a place of use, a valve device located in the inlet chamber to control the flow into the said ports, the valve device having a central position such that fluid may enter both ports, and means yieldably biasing the valve device toward its central position, the valve device being arranged to close one of the ports when the corresponding control valve is in its neutral position and the other control valve is moved to its operating position.

6. A valve mechanism comprising a casing shaped to provide an inlet chamber for fluid under pressure with two opposed ports leading outwardly therefrom, an independently operable control valve associated with each port, each valve having a neutral position in which the fluid entering the corresponding port will be allowed to exhaust at low pressure and an operating position in which the fluid will be directed to a place of use, a valve device mounted between the ports to control the flow into the same, the valve device having a central position such that fluid may enter both ports, and means yieldably biasing the valve device toward its central position, the valve device being movable in opposite directions from its central position and arranged to close one of the ports when the corresponding control valve is in its neutral position and the other control valve is moved to its operating position.

7. A valve mechanism comprising a casing shaped to provide an inlet chamber for fluid under pressure with two opposed and aligned ports leading outwardly therefrom, an independently operable control valve associated with each port, each valve having a neutral position in which the fluid entering the corresponding port will be allowed to exhaust at low pressure and an operating position in which the fluid will be directed to a place of use, a valve device reciprocably mounted between the ports to control the flow into the same, the valve device having a central position such that fluid may enter both ports, and means yieldably biasing the valve device toward its central position, the valve device being movable in opposite directions from its central position and arranged to be moved by the fluid pressure and close one of the ports when the corresponding control valve is in its neutral position and the other control valve is moved to its operating position.

8. A valve mechanism comprising a casing shaped to provide an inlet chamber for fluid under pressure, two independently operable rotary control valves mounted on opposite sides of the inlet chamber and axially aligned, each valve having an axially located port communicating with the inlet chamber and surrounded at its inner end by an annular valve seat, each valve having a neutral position in which the fluid entering the corresponding port will be allowed to exhaust at low pressure and an operating position in which the fluid will be directed to a place of use, a valve device reciprocally mounted between the valve seats to control the flow into the ports, the valve having a central position such that fluid may enter both ports, and means yieldably biasing the valve device toward its central position, the valve device being movable in opposite directions from its central position and arranged to be moved by the fluid pressure into contact with one of the valve seats when the corresponding control valve is in its neutral position and the other control valve is moved to its operating position.

9. A valve mechanism comprising a casing shaped to provide an inlet chamber for fluid under pressure, two independently operable rotary control valves mounted on opposite sides of the inlet chamber and axially aligned, each valve having an axially located port communicating with the inlet chamber and surrounded at its inner end by an annular valve seat, each valve having a neutral position in which the fluid entering the corresponding port will be allowed to exhaust at low pressure and an operating position in which the fluid will be directed to a place of use, a disk-shaped valve device mounted between the valve seats and provided on opposite sides with valve stems which extend into the said valve ports, means slidably supporting the valve stems, and springs engaging the valve stems and yieldably biasing the valve device to a central position midway between the valve seats and such that fluid may enter both ports, the valve device being arranged to be moved by the fluid pressure into contact with one of the valve seats when the corresponding control valve is in its neutral position and the other valve is moved to its operating position.

PAUL C. TEMPLE.